US005653933A

United States Patent [19]

Heinz et al.

[11] Patent Number: 5,653,933

[45] Date of Patent: Aug. 5, 1997

[54] METHOD OF USING ANGLED SOAP DIES

[75] Inventors: Daniel Heinz, Joppa; Pasquale Buzzeo, Westminster, both of Md.

[73] Assignee: Lever Brothers Company, Division of Conopco, Inc., New York, N.Y.

[21] Appl. No.: 439,732

[22] Filed: May 12, 1995

[51] Int. Cl.$^{6}$ .......... B29C 43/08

[52] U.S. Cl. .......... 264/297.5; 264/37; 264/297.6; 264/297.8; 264/320; 264/325; 425/395

[58] Field of Search .......... 249/55, 119; 264/319, 264/320, 325, 245, 297.8, 297.9, 37, 297.5, 297.6; 425/363, 373, 374, 395, 444, 129

[56] References Cited

U.S. PATENT DOCUMENTS

| | | | |
|---|---|---|---|
| 2,802 | 10/1842 | Boardman | 249/119 |
| 461,973 | 10/1891 | Brown | 264/325 |
| 1,827,549 | 10/1931 | Villain | 264/325 |
| 1,891,744 | 12/1932 | Blair | 425/363 |
| 3,365,764 | 1/1968 | Wall | 425/395 |
| 3,588,029 | 6/1971 | Hinds | 249/119 |
| 3,776,998 | 12/1973 | Church | 264/297.8 |
| 3,899,566 | 8/1975 | Murray | 264/245 |
| 4,793,959 | 12/1988 | Adams et al. | 264/320 |
| 5,194,211 | 3/1993 | Adams et al. | 264/320 |
| 5,236,654 | 8/1993 | Adams et al. | 264/320 |
| 5,269,997 | 12/1993 | Leslie | 264/320 |

OTHER PUBLICATIONS

Binacchi & Co. "USN" Soap Press Specifications.

*Primary Examiner*—Mathieu D. Vargot
*Attorney, Agent, or Firm*—Ronald A. Koatz

[57] ABSTRACT

The present invention relates to a die used in bar stamping. Specifically, it relates to the orientation of cavities found on the die whereby, by angling the x-axis across the cavities at 10° to 90° from the horizontal axis of the press on which they are mounted, it is possible to add more cavities over a fixed length and/or to reduce spacing between cavities and thereby reduce rework. Surprisingly, the cavities are all filled using the same billet volume and, because the same volume fills more cavities, there is less rework and higher ultimate throughput.

3 Claims, 3 Drawing Sheets

FIG.2
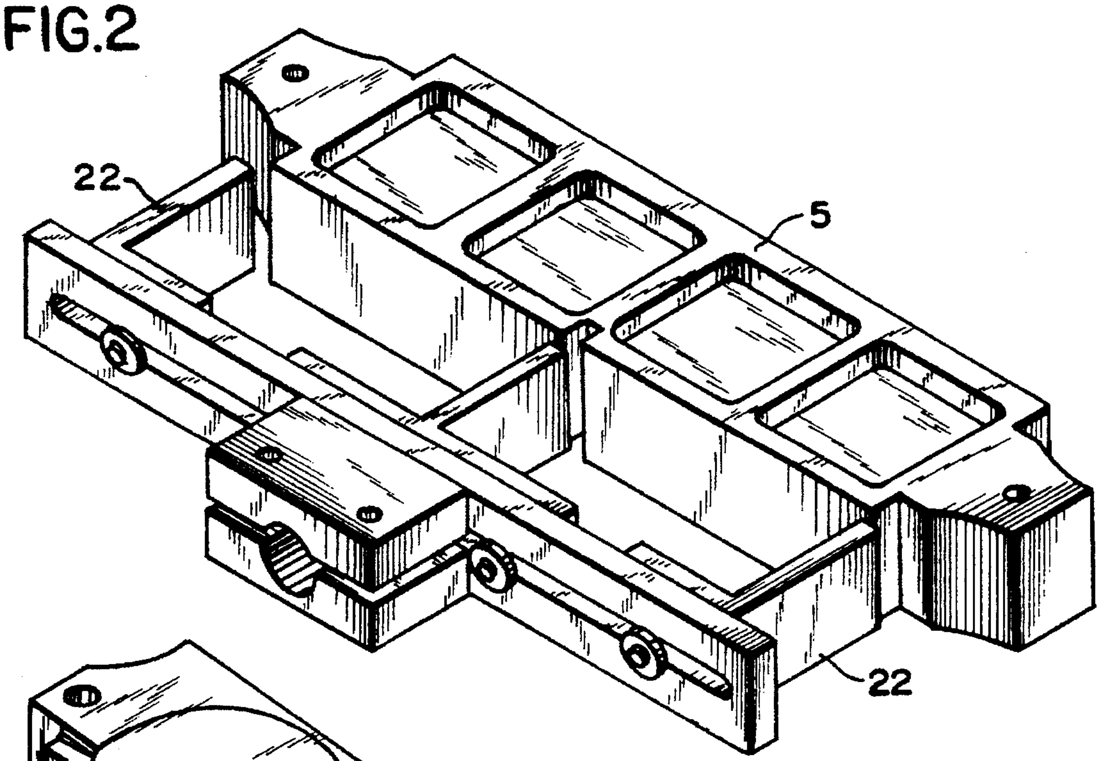
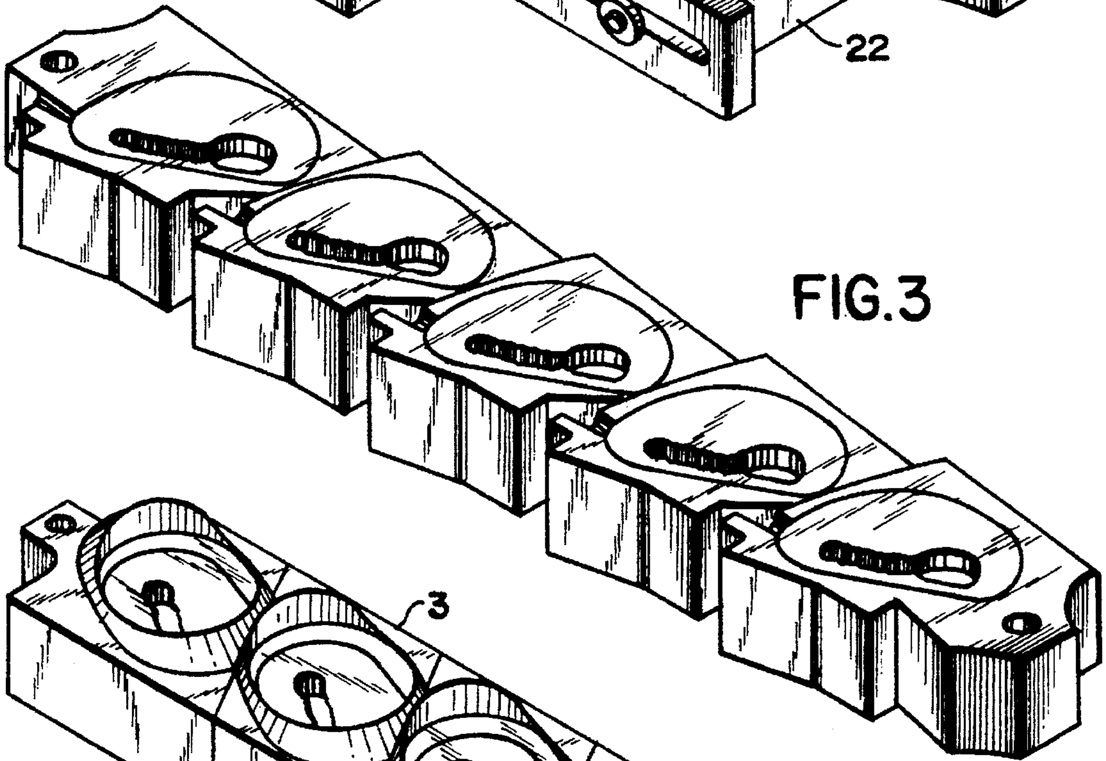
FIG.3
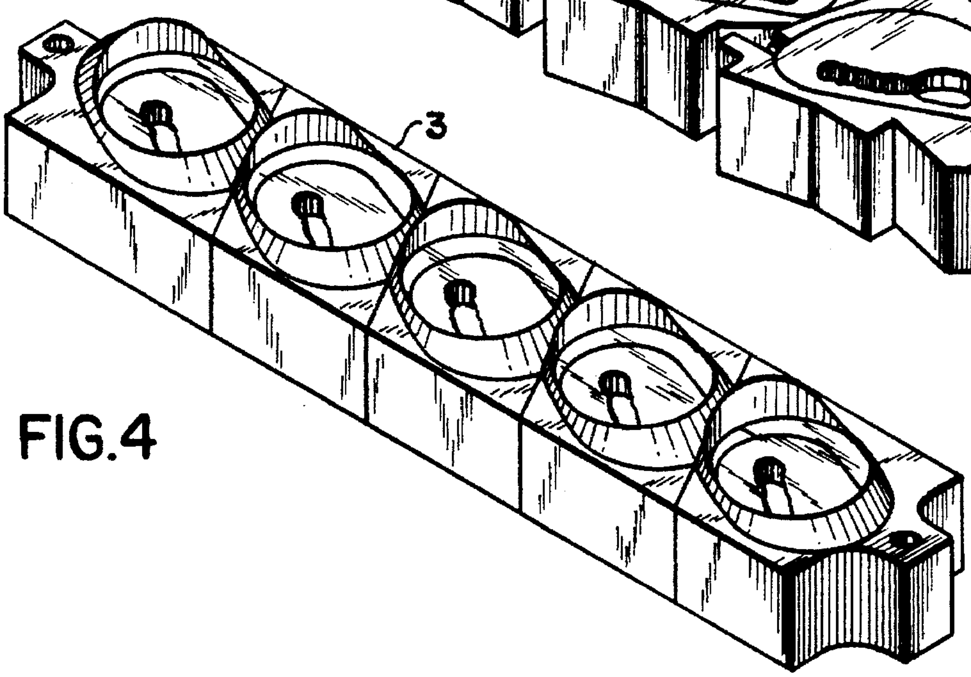
FIG.4

METHOD OF USING ANGLED SOAP DIES

FIELD OF THE INVENTION

The present invention relates to dies which are used in the bar stamping process, i.e., the process in which soap and/or detergent bars are stamped from extruded billets of material. More particularly, it relates to the orientations of a plurality of cavities normally found on soap bar dies which dies are in turn attached (e.g., screwed) onto a press.

BACKGROUND OF THE INVENTION

Traditionally, soap bars are stamped from extruded billets of material in order to achieve bars of an attractive and uniform appearance. Bar stamping may be accomplished using a pair of opposing die members which are physically brought together (i.e., in the compaction step) to stamp the bars.

Rather than pressing together opposing die members forming a single cavity, the die can be an extended die, having a plurality of cavities on the die. The length of the die (and die backplate) is in fact fixed by the length of the press against which the die and die plate are mounted. Since as a practical matter, the press is bought as a standard size piece from the supplier, the length of the press and of the die are fixed.

Until now, it has been believed that the die cavities must be molded or machined such that an imaginary line crossing across the horizontal x-axis of the die would also cut across the horizontal x-axis right in the center of each of the die cavities on the die. That is, each of the cavities have been machined or molded to lie next to the other with a small space between one cavity and the other.

The spacing between the die cavities has been believed to be especially critical because when a billet (a "log" refers to the long extruded pieces after extrusion before cutting; a billet refers to the pieces after cutting; and a bar refers to the piece after it has been stamped from the billet) of soap which is about to be stamped is placed between the dies, it has been believed that a minimum amount of soap (soap volume of billet) is required to fill out the cavities. If the cavities were too close together, it has been believed that the soap cavities would not fill up and that the billets thus made would be no good.

Indeed, if one looks at a typical specification sheet from Binacchi and Company, i.e., the company which makes the soap presses used in stamping (see Binacchi "USN" Soap Press Specification Sheet), it can be seen that "A" refers to spacing between bars and "B" refers to the width of the bar at the edges. According to the specification sheet, as B gets greater, (i.e., from B=0 to B=0 to 8 to B=8 to 15 etc.), the spacing between die cavities A must also be made greater. Thus, there is a clear teaching away from the manufacturer of the industry used press to move the spacing together.

On the other hand, while spacing cavities further apart has been desirable to ensure die cavities are completely filled, the additional area between cavities also means that there will be additional rework (i.e., the amount of soap not used to fill the cavities and which must be sent back into the soap plodder to be "reworked" before being recycled once more to the stamping machinery). Rework is also known in the art as "flash".

Any flash or rework which must be sent back to the plodder means that the plodder, which has limited capacity to begin with, must be fed less soap mixture coming from further upstream into the plodder and this in turn ultimately means the throughput of finished bars is lessened.

Unexpectedly, applicants have found that, if the die cavities/bars are angled so that the horizontal axis of the cavity or bar is angled away from the horizontal axis of the press onto which the die is mounted, it is possible (though not required) to increase the number of die cavities over a fixed length of press (i.e., by at least one).

Further, because the spacing between the die cavities is reduced, the amount of soap rework is significantly reduced (i.e., because more of the soap/billets are being stamped into bars). Moreover, applicants have found that the additional cavity (e.g., 5 cavities instead of 4 in the case of examples shown) is filled using the same volume of extruded billet. It was particularly surprising to find that one can reduce spacing between cavities and fill out an additional cavity using the same volume of soap.

BRIEF SUMMARY OF THE INVENTION

In one embodiment, the present invention relates to a die of finite length (generally determined by what length of press is commercially available from the manufacturer) onto which one or more additional cavities can be fit by angling the cavities in a way that the horizontal axis (X-axis) across the die cavity or bar is about 10° to 90% preferably 20° to 60°, more preferably 25°–45° from the horizontal axis of the press. The cavities may be angled even if no additional cavities are added (i.e., to obtain rework benefits discussed below).

In another embodiment, the invention relates to a method of increasing the number of cavities in a die by at least one by angling the cavities in the aforementioned manner.

In another embodiment, the invention relates to a method of reducing rework ("flash") during the process of stamping soap bars which method comprises reducing the space between the cavities (i.e., between the edge of one cavity and the next cavity) by angling the cavities about 10° to 90°, preferably 20° to 60°, more preferably 25°–45° from the horizontal axis of the press onto which a die (on which the die cavities are machined or molded) is attached.

BRIEF DESCRIPTION OF THE DRAWINGS

FIG. 2 shows a billet elevator which is used to elevate the billet up to between the reciprocating and rotary stamping dies where they will be shaped. Again, this Figure depicts the currently used die with four (4) die cavities placed on same horizontal axis as the press.

FIG. 3 shows the angled rotary die of the invention wherein the horizontal axis across the cavity or bar is angled at 25°–30° from the horizontal axis of the press. It can be seen the die now holds five cavities over the same length of die, i.e., a 20 inch die (length of die controlled by length of press as available from manufacturer). As noted, the Figure shows the rotary die half of the die. Soap ejectors have been removed from the figure.

FIG. 4 is a view of the angled reciprocating die. Soap ejectors have been removed from the Figure.

DETAILED DESCRIPTION OF THE INVENTION

Figure 1:
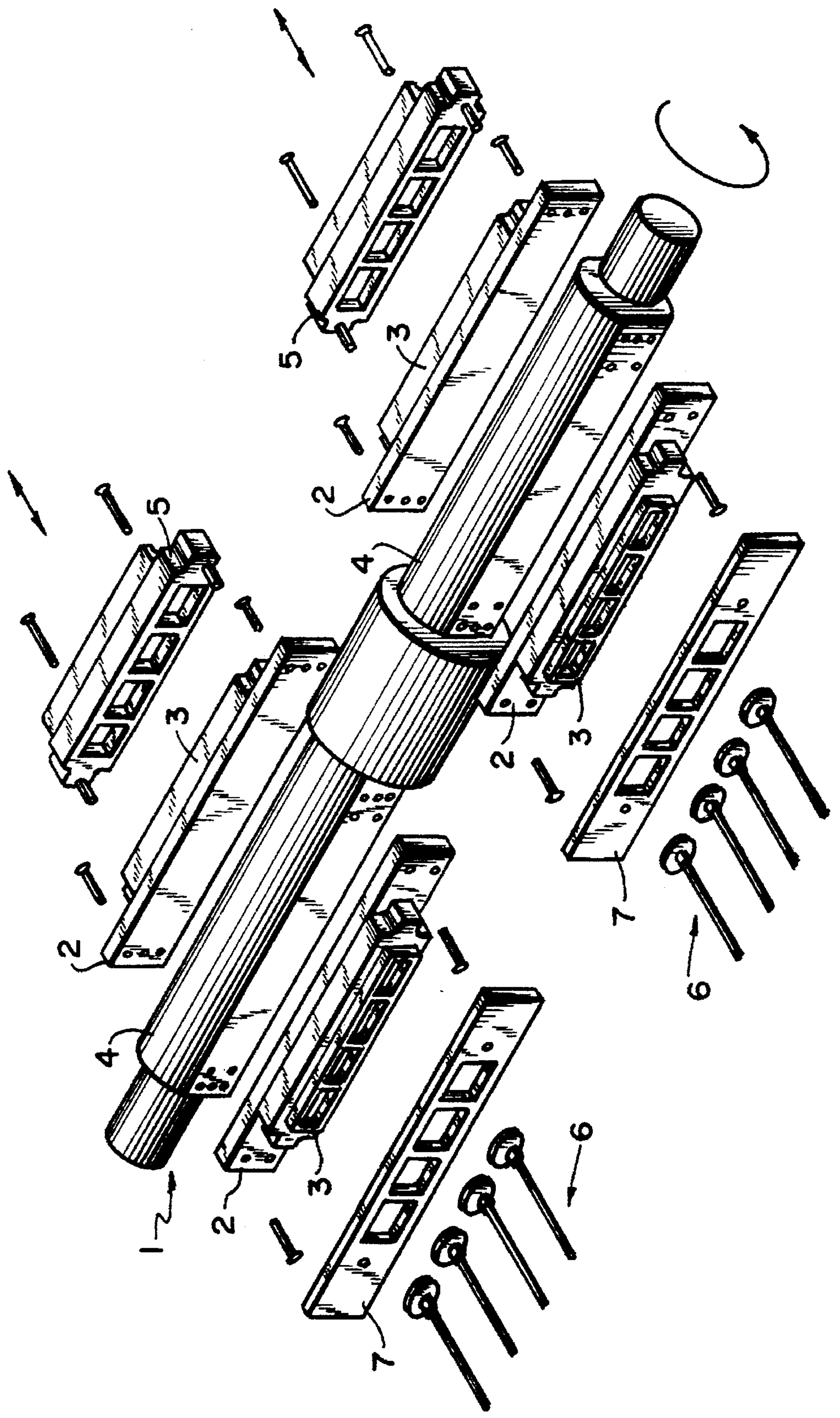
FIG. 1 shows a typical operating soap stamping apparatus including operating positions of the reciprocating and rotary stamping die components of the die containing the die cavities. The Figure shows dies which are currently used having four cavities and having the horizontal axis of each cavity along same horizontal axis as the press.
Figure 1A:
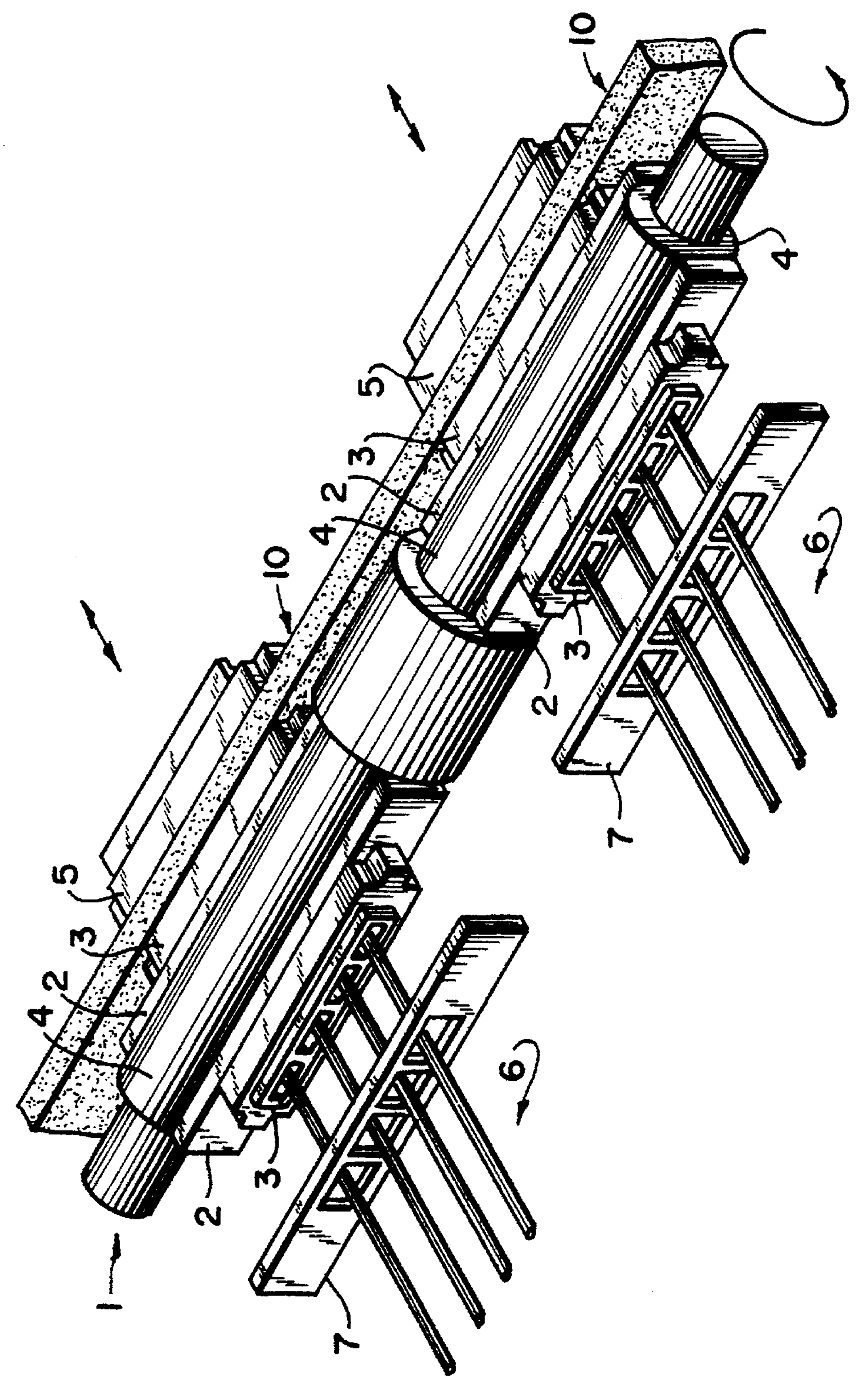

The present invention relates to a die in which the x-axis across the cavities normally molded or machined on the die have been angled 10°–90°, preferably 20°–60° from the horizontal axis of the press onto which the die is mounted (e.g., by screwing). By angling the die cavities in this manner, it is possible to increase the number of cavities which can be fit onto a fixed length of die (which length is constrained by the length of the press onto which the die is mounted and wherein the length of the press is in turn constrained by what is commercially available).

In addition, angling the dies allows there to be a reduction in the spacing between the die cavities (which had previously laid with their horizontal axis the same as the horizontal axis of the press). Although reduction in spacing leads to reduced rework when the soap billets are stamped, it has previously been believed that a minimum amount of billet volume is required to ensure all the die cavities properly fill out.

Unexpectedly, however, it has been found that it is possible to use the same billet volume and still fill out all the cavities. In other words, using the same volume, it is possible to make five bars (in this case) instead of four.

As noted, this is extremely important because the soap rework would otherwise normally be sent back to a plodder to be reworked. Since the plodder itself is of limited capacity, the greater the rework, the less the ultimate throughput. Thus, the invention allows more bars to be made and results in tremendous economic advantages.

In this case, five cavities were made in place of four over the length of the die. It should be understood, however, that there is no reason that, if the presses were ever manufactured larger, for example, over a longer length of die, it would be possible to add more than one additional cavity.

Thus, one embodiment of the invention relates to a die used in a soap making process in which die the horizontal axis across the cavities have been angled at 10°–90°, preferably 20°–60°, more preferably 25°–45° from the horizontal axis of the press onto which the die is mounted. The angling allows the die to have at least one more cavity than previously obtainable over the same length of die. Angling can be done even if additional cavities are not added for reasons noted below.

In a second embodiment, the invention relates to a method of increasing the number of cavities on a die by at least one, which method comprises angling the horizontal axis across the cavities about 10°–90°, preferably 20°–60° from the horizontal axis of the press itself.

While one of the major advantages of the invention is the addition of at least one more cavity, it should be understood that the axis across the cavities may be angled simply to reduce spacing between the cavities and therefore reduce rework. In the example of the invention, the angling of the die does allow incorporating of five cavities on the die rather than four. As noted, however, more cavities can be added if the die is larger or perhaps none at all, for example, in order to reduce rework if the die is shorter (assuming the same dimension of cavity).

In a third embodiment of the invention, the invention relates to a method of reducing rework by angling the x-axis across the cavities which are molded or machined in the die at 10°–90° preferably 20°–60°, more preferably 25°–45° from the horizontal axis of the press on which they are mounted.

Rework is lessened by reducing the spacing between the die cavities. Thus in previous art, it has been believed that spacing may be from, for example, 7 to 12 millimeters apart (see Binacchi specifications), while using the angled dies of the invention, the spacing can be down to 0 millimeters (e.g., where edge of one cavity is on same tangent as edge of second angled cavity) and may certainly be less than 7 mm, e.g., 0 to 6 mm. or 1 to 5 mm.

While angling of the cavities may be broadly defined as 10°–90°, there may be practical constraints as to how close to 90° from horizontal one can angle the die cavities. For example, a long bar of soap oriented at 90° cannot be rotated because of the height of the die cavity (e.g., when rotating, the cavity could interfere with the machinery). Of course, if one wanted to make bars very short in length, in theory the cavities can be angled this high.

The bars which are stamped according to the subject invention may be, for example, a traditional fatty acid soap bar. Soap bars are cheap, easy to manufacture and lather well.

Preferably, however, the bars of the invention are non-soap detergent bars. In such bars, soaps are replaced with milder suffactants such as, for example, sodium cocoyl isethionate (see U.S. Pat. No. 2,894,912 to Geitz, for example, incorporated by reference into the subject application) or alkyl ether sulfonates. See also U.S. Pat. No. 4,695,395 to Caswell et al, incorporated herein by reference into the subject application.

Referring now to FIG. 1, applicants have shown a typical stamping apparatus. Typically, the "press" refers to the long "rolling pin" like piece 1 onto which the rotary stamping half of the die 3 is mounted via the rotary die backplate 2. More particularly, the press is divided into two flat areas 4 onto which the rotary dies 3 are mounted.

The die consists of not only the rotary stamping die 3, but also of the other half of the die, the so called reciprocating die 5. In operation, the reciprocating dies move back and forth during the so-called compaction step to stamp the billet between the rotary and reciprocating die halves.

After compaction, the rotary die is rotated 180° so that another rotary die 3 is set to undergo compaction while, at the same time, the bars already stamped are removed by suction cups 6 through a stripper plate 7. The stripper plate removes the soap which does not fill the cavities (which is called "flash") and the flash is recycled into a plodder as discussed above.

The die of the invention containing angled die cavities would be used in place of rotary stamping die 3 and reciprocating die 5 and, as noted, size would be constrained by the size of the flat areas 4 on which it is mounted.

FIG. 2 refers to what it is known as the billet elevator 22 which is used to elevate the billets for stamping. In the figure, the elevator 22 is designed to nestle into notches found in the reciprocating die 5.

FIGS. 3 and 4 are figures of the die of the invention which has five cavities over the same length where previously there were 4. The Figures show the rotary and reciprocating half of the die.

These particular cavities are designed to stamp a typical Dove® shaped bar although, it will be understood, the cavities can be cut into various shapes and the shapes are not limited in any way.

FIG. 3 is a figure of one-half of the die. FIG. 4 is the other half.

The following examples are intended to further illustrate the invention and are not intended to limit the invention or claims in any way.

EXAMPLE 1

A trial of bath dies with 5 angled cavities (as shown in FIGS. 3 and 4) rather than 4 cavity horizontal orientation was conducted (1) to evaluate bar quality; (2) to measure soap rework reduction; and (3) to determine suitable billet size and shape.

Surprisingly, it was found that billet volume did not have to be increased. The existing billet size and shape was able to fill the die cavities and produce bar quality equal to current high standards.

In addition with one die, five bars were stamped per machine cycle instead of the current four.

Finally because the same billet volume could be used while reducing the spacing between cavities, a significant reduction in rework was obtained as seen below:

|  | Billet wt. | Bars wt. | Rework |
|---|---|---|---|
| Existing dies | 839 g | 546 g | 35% |
| Angled dies | 839 g | 682.5 g | 19% |

This represents a tremendous 46% reduction in rework.

Billets were slightly contoured, 2" high×1⅜" wide with 1³⁄₁₆" flats top & bottom×17½" lg. Die gap was 0.008".

We claim:

1. A method for reducing the amount of rework which is recycled into a plodder used in a soap-making process which method comprise's increasing the number of cavities which are molded or machined into a soap die by angling the horizontal axis across the cavities molded or machined into said die used to stamp soap billets at an angle of 10°–90° from the horizontal axis of a press onto which said die is mounted.

2. A method according to claim 1, wherein the axis across the cavities is angled at 20°–60°.

3. A method according to claim 2, wherein the axis across the cavities is angled at 25°–45°.

* * * * *